(12) United States Patent
Bryant et al.

(10) Patent No.: US 6,278,779 B1
(45) Date of Patent: *Aug. 21, 2001

(54) TELEPHONE SHOULDER REST AND STAND

(75) Inventors: David E. Bryant, Austin; William J. Morris, Round Rock, both of TX (US)

(73) Assignee: Siemens Information and Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,204

(22) Filed: Jun. 19, 1998

(51) Int. Cl.[7] ............................ H04M 1/00
(52) U.S. Cl. ............ 379/449; 379/446; 379/454; 379/455
(58) Field of Search ................. 379/449, 446, 379/455, 454, 447

(56) References Cited

U.S. PATENT DOCUMENTS 3,902,025 * 8/1975 Lewis ............................ 379/449
4,058,689 * 11/1977 Stebinger ...................... 379/449

* cited by examiner

Primary Examiner—Jack Chiang (57) ABSTRACT

An accessory device for a wireless telephone or handset functions as either a shoulder rest or a stand. The accessory device has a pair of attaching arms with a pair of attaching pins for attaching the device to the rear surface of a handset by inserting the attaching pins into openings on the handset. The attaching arms extend from a body of the device. A sliding arm slides through the body of the device in a continuous action to multiple configurations. When the sliding arm is fully extended to the bottom of the body, the device is in a configuration to operate as a stand. A foot at the bottom of the device provides support to the handset to hold it in a generally upright position. When the sliding arm is extended out the top of the body, the device is in a configuration to operate as a shoulder rest. A user can hold the handset with the attached device between his head and shoulder like a conventional shoulder rest. The device has a locking pin that also extends through the body of the device. When the locking pin is placed in an unlocked position, the sliding arm is free to slide to a different position. When the locking pin is placed in a locked position, ridges on the locking pin press against ridges on the sliding arm and lock the sliding arm in a substantially fixed position.

23 Claims, 8 Drawing Sheets

FIG. 6B ously, reviewing a patent application file, when the telephone rings. The person might have to make arrangements to save a place in the file before being able to reach for the phone to check a caller ID, only to find out that it is a call that does not have to be taken at that time.

What is needed is a stand that will hold the phone in an upright position so that a user can easily and quickly read the telephone display at any time. With a proper stand and the increased size and functionality of the display, a wireless telephone can be almost as convenient and effective as a desktop telephone. At the same time, however, the wireless telephone has the obvious advantage of giving the user mobility. A stand for a wireless telephone should not unnecessarily restrict this mobility. Thus, the stand should be small, lightweight and easily removed from the telephone.

Many people also like to use telephones while they are doing other things. For example, someone might want to review a patent application file while talking on the telephone. This person might pin the telephone handset between his head and shoulder so that the microphone of the handset is near the user's mouth, while the speaker of the handset is near the user's ear. This same technique can be used whether the user is using a desktop phone or a wireless phone. There are shoulder rest accessories widely available for desktop telephones. These shoulder rests would generally not be effective for use with a wireless telephone, however, for two primary reasons. First, wireless telephones are generally shaped differently from the handset of a desktop telephone. Second, the shoulder rests for desktop telephones are not designed for mobility. The shoulder rest for a wireless telephone should be small, lightweight and easily removed.

SUMMARY OF THE INVENTION

The invention comprises a shoulder rest and stand for a wireless telephone or handset. The preferred embodiment comprises an accessory device that attaches to a wireless handset. The accessory device has a body, an attaching mechanism extending from the body, a sliding arm secured partially within the body in a slidable manner and a locking mechanism. The attaching mechanism attaches the support to the handset. The sliding arm is slidable between a stand position and a shoulder rest position. The sliding arm provides support for the handset in the stand position to maintain the handset in a generally upright position. The sliding arm has a shoulder rest surface, the surface being positioned, when the sliding arm is in the shoulder rest position, so that a user can hold the handset and the shoulder rest and stand between his head and shoulder in a hands-free technique. The locking mechanism has a locked configuration and an unlocked configuration. The locking mechanism substantially fixes the sliding arm in the stand position or the shoulder rest position when in the locked configuration and allows the sliding arm to be slid between the stand position and the shoulder rest position when in the unlocked configuration. Also in the preferred embodiment, the sliding arm is continuously slidable to multiple shoulder rest positions. Also, the locking mechanism comprises a locking pin that has one or more ridges that press against one or more ridges on the sliding arm when the locking mechanism is in the locked configuration.

DETAILED DESCRIPTION

The preferred embodiment of the invention is illustrated and described in terms of the first commercial embodiment of the invention, which was designed for use with a handset of a cordless telephone. The invention also applies to other types of telephones, such as a cellular telephone or other wireless telephone.

Figure 1:
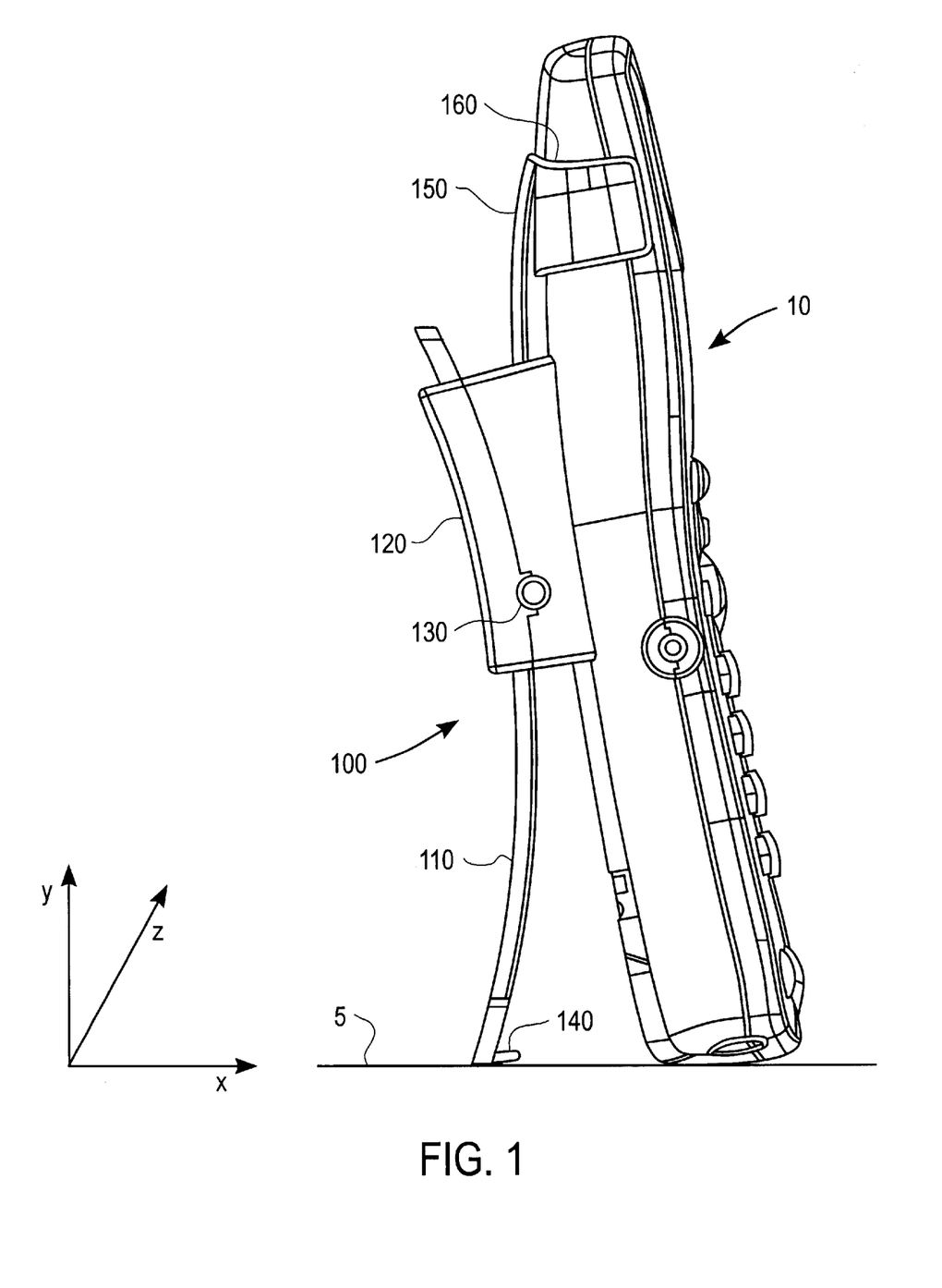
FIG. 1 shows a telephone shoulder rest and stand of the invention attached to a wireless telephone and configured to operate as a stand.
Figure 2:
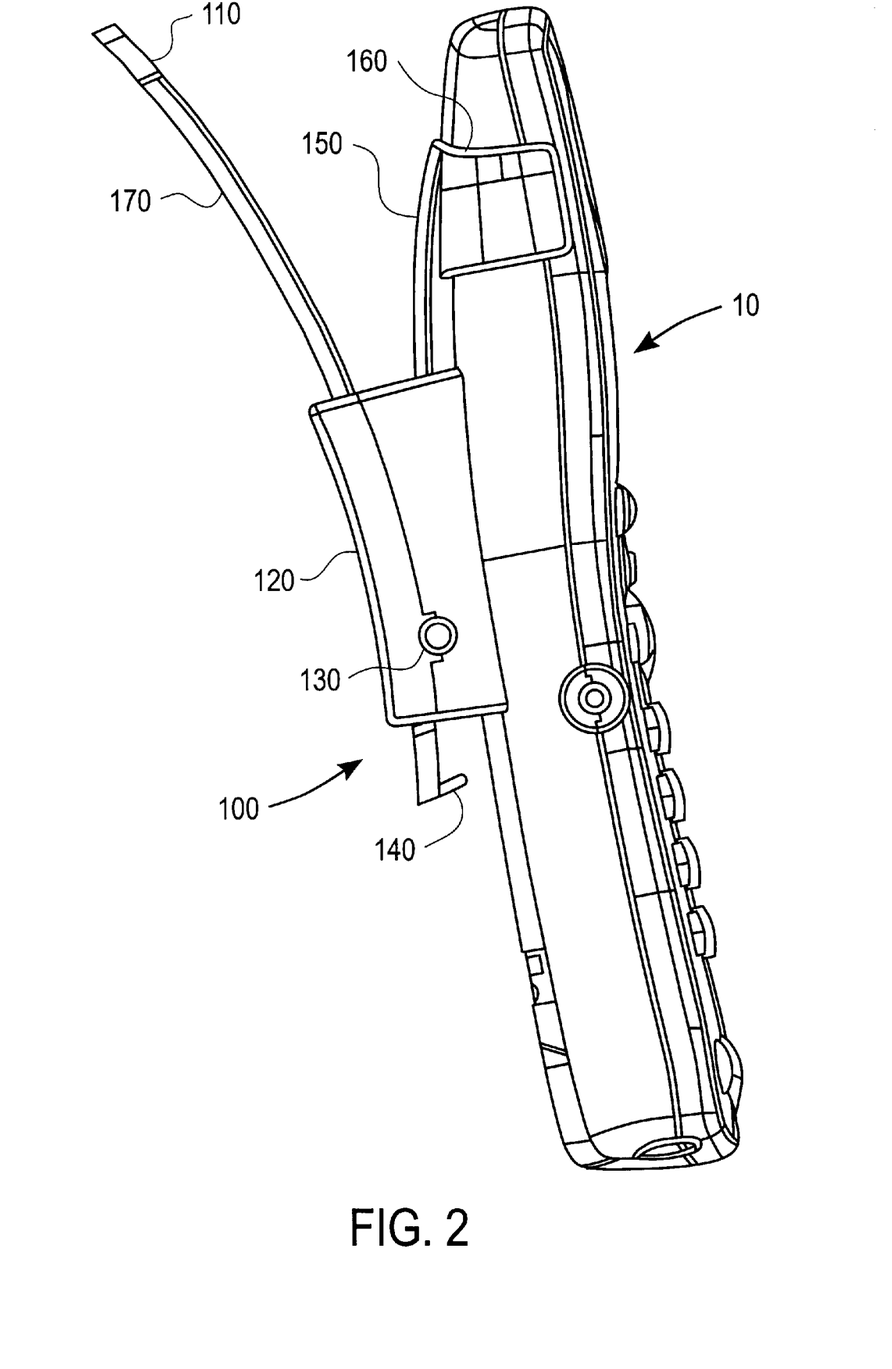
FIG. 2 shows a telephone shoulder rest and stand of the invention attached to a wireless telephone and configured to operate as a shoulder rest.
Figure 3:
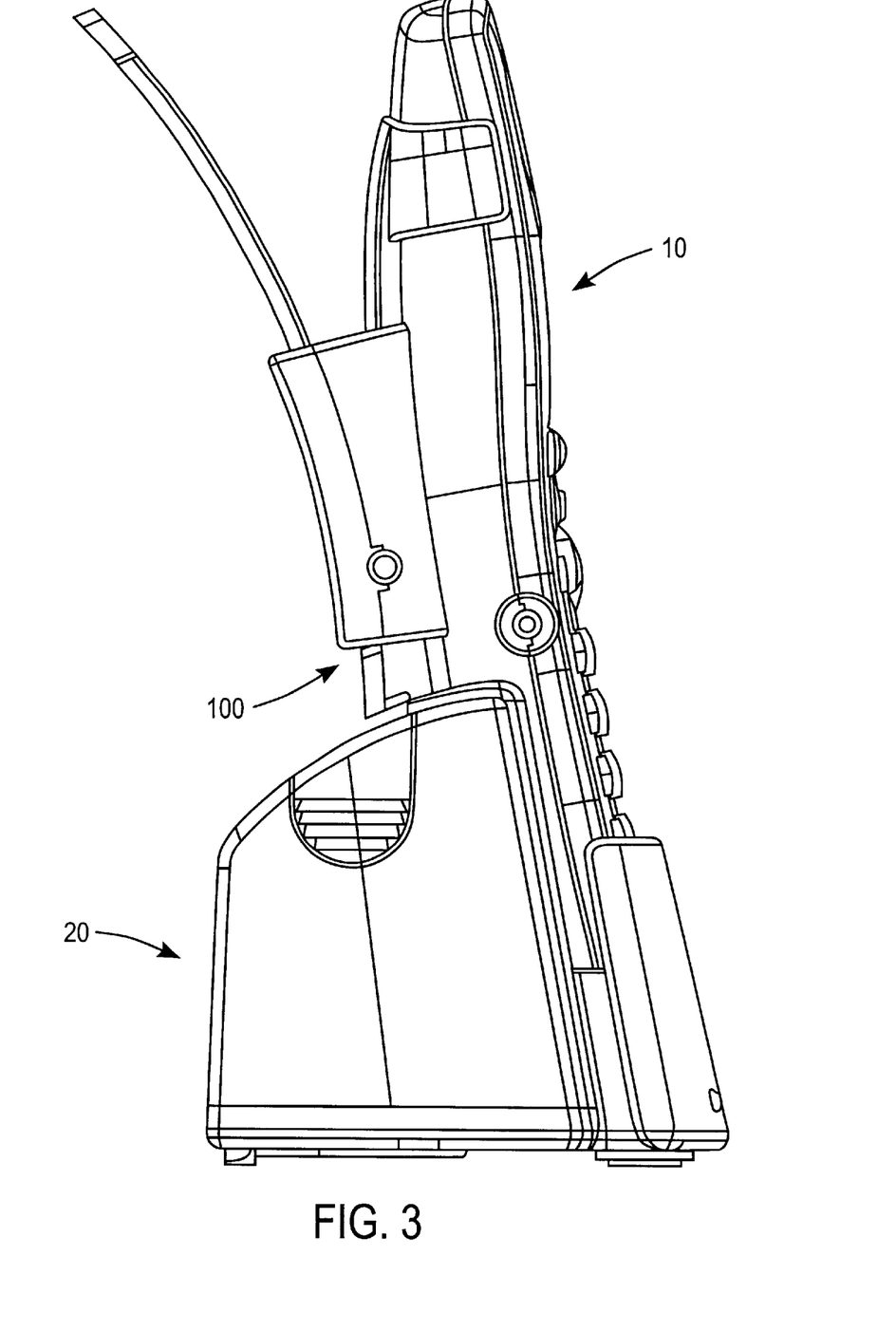
FIG. 3 shows a telephone shoulder rest and stand of the invention attached to a wireless telephone and configured so that the telephone can be mount in a battery charger, as shown.

FIGS. 1, 2 and 3 show a telephone shoulder rest and stand 100 attached to a cordless telephone handset 10. The handset 10 interfaces with a base station (not shown) of a cordless telephone to place and receive telephone calls over a public or private telephone network. The telephone shoulder rest and stand 100 is also referred to more simply as a support 100. In FIG. 1, the support 100 is configured to operate as a stand. In FIG. 2, the support is configured to operate as a shoulder rest. In FIG. 3, the support is configured to allow the handset 10 to be inserted into a battery charger 20, as shown in FIG. 3. The configuration of the support 100 is the same for both FIGS. 2 and 3.

As shown in FIGS. 1–3, the support 100 comprises a sliding arm 110, a body 120, a locking pin 130, a foot 140, an attaching extension 150, a pair of attaching arms 160 and a shoulder rest surface 170.

Figure 6A:
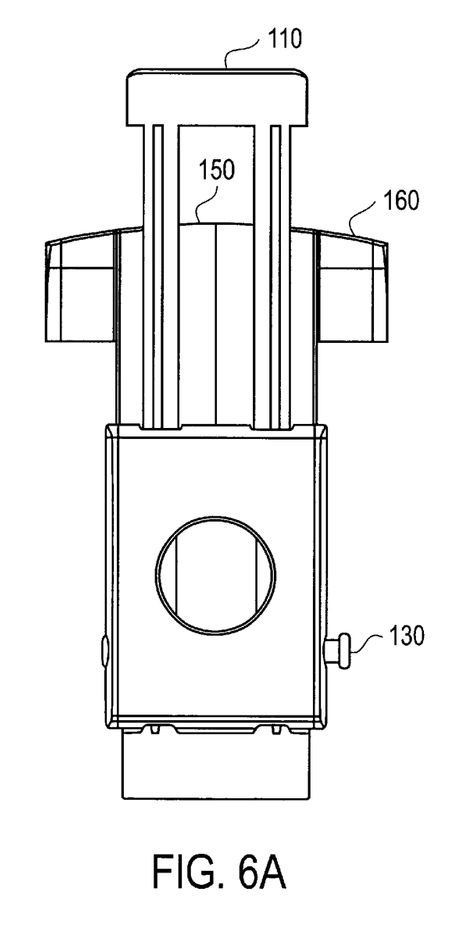
FIG. 6A is a rear elevational view of a telephone shoulder rest and stand of the invention in an unlocked configuration, so that a sliding arm can be adjust
Figure 6B:
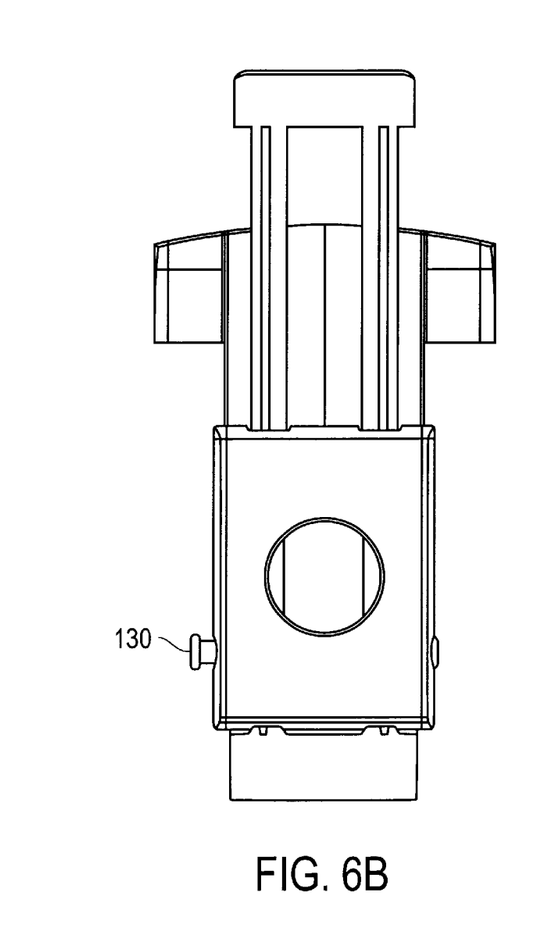
FIG. 6B is a rear elevational view of a telephone shoulder rest and stand of the invention in a locked configuration, so that the sliding arm is locked in a substantially fixed position.

FIG. 1 also shows a table or other generally horizontal surface 5 on which the handset 10 and support 100 are standing. The support 100 supports the handset 10 in a generally upright position so that the display of the handset 10 is easily viewable by a person sitting at the table 5. The curvature of the sliding arm 110 causes the foot 140 to be displaced significantly to the left of the handset 10. This displacement provides support against forces in a positive or negative X direction (see Cartesian coordinate diagram in FIG. 1) to maintain the combination of the handset 10 and the support 100 in a standing position. The width of the foot 140 (as illustrated in FIGS. 6A and 6B) provides support against forces in the positive or negative Z direction.

As described briefly above, FIG. 2 shows the support 100 in a configuration for operation as a shoulder rest. In this configuration, a user of the telephone can place the combination handset 10 and support 100 between his shoulder and his head, with a speaker of the telephone adjacent to the user's ear and a microphone of the telephone adjacent to the user's mouth. The user can then move his head and shoulder toward one another until the user's head makes contact with the handset 10 and the user's shoulder makes contact with the surface 170 of the support 100. The user's shoulder may also make contact with other parts of the support 100, such as the body 120. By pressing the combination handset 10 and support 100 between his head and shoulder, the user can maintain the phone in a position that allows the user to carry on a telephone conversation, without requiring the use of the user's hands. Thus, the user can have a hands-free telephone conversation. A user could perform this same hands-free technique without a shoulder rest, but this would be much less comfortable, especially because of the thinness of many newer wireless handsets.

FIGS. 1 and 2 show the two extreme configurations for the support 100. In FIG. 1, the sliding arm 110 is locked at its maximum extension below the body 120, while in FIG. 2, the sliding arm 110 is locked at its maximum extension above the body 120. The sliding arm 110 is continuously adjustable, so that it can also be locked at any position between these two extremes. This feature may be advantageous for various purposes. For example, some users of the telephone may find that the support 100 can be used more comfortably as a shoulder rest if the sliding arm 110 is not fully extended above the body 120.

As shown in FIG. 3, the support 100 can remain attached to the handset 10 when the handset 10 is inserted into a battery charger 20. This feature is advantageous in that the support 100 does not have to be removed from the handset 10, stored elsewhere, retrieved from storage, or re-attached to the handset 10 whenever a battery pack of the handset 10 is recharged.

Figure 4A:
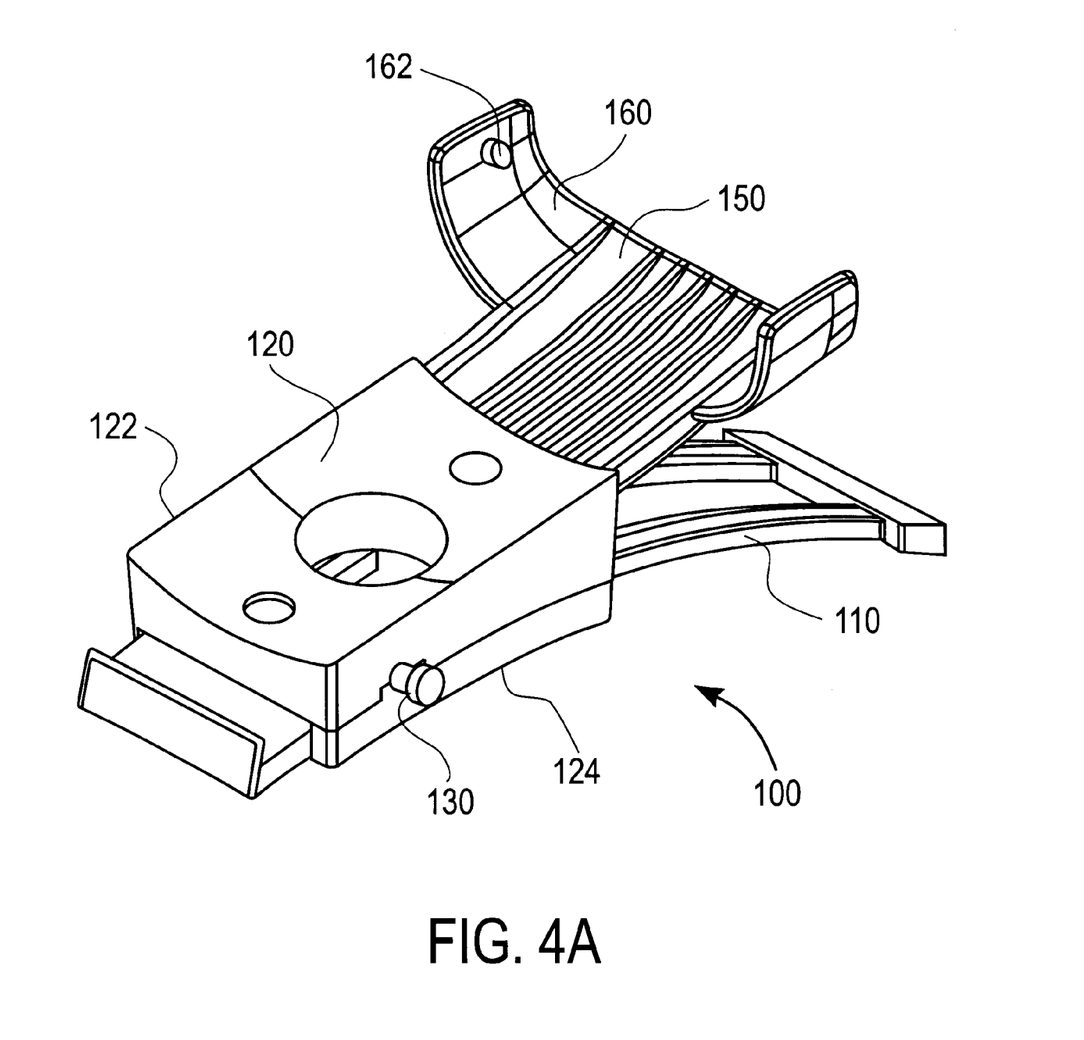
FIG. 4A is a front perspective view of a telephone shoulder rest and stand of the invention.
Figure 4B:
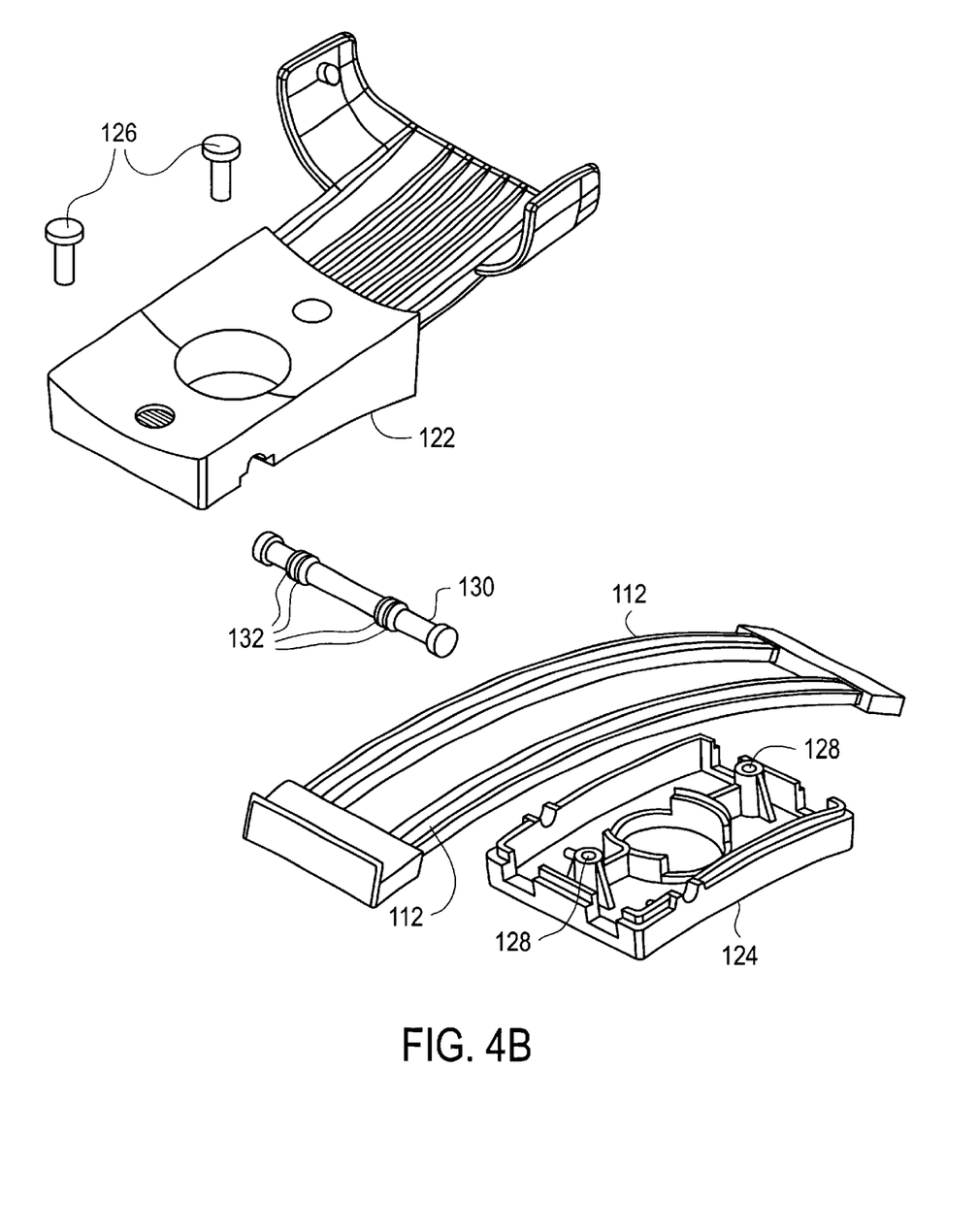
FIG. 4B is an exploded view of a telephone shoulder rest and stand of the invention, corresponding to FIG. 4A.
Figure 5A:
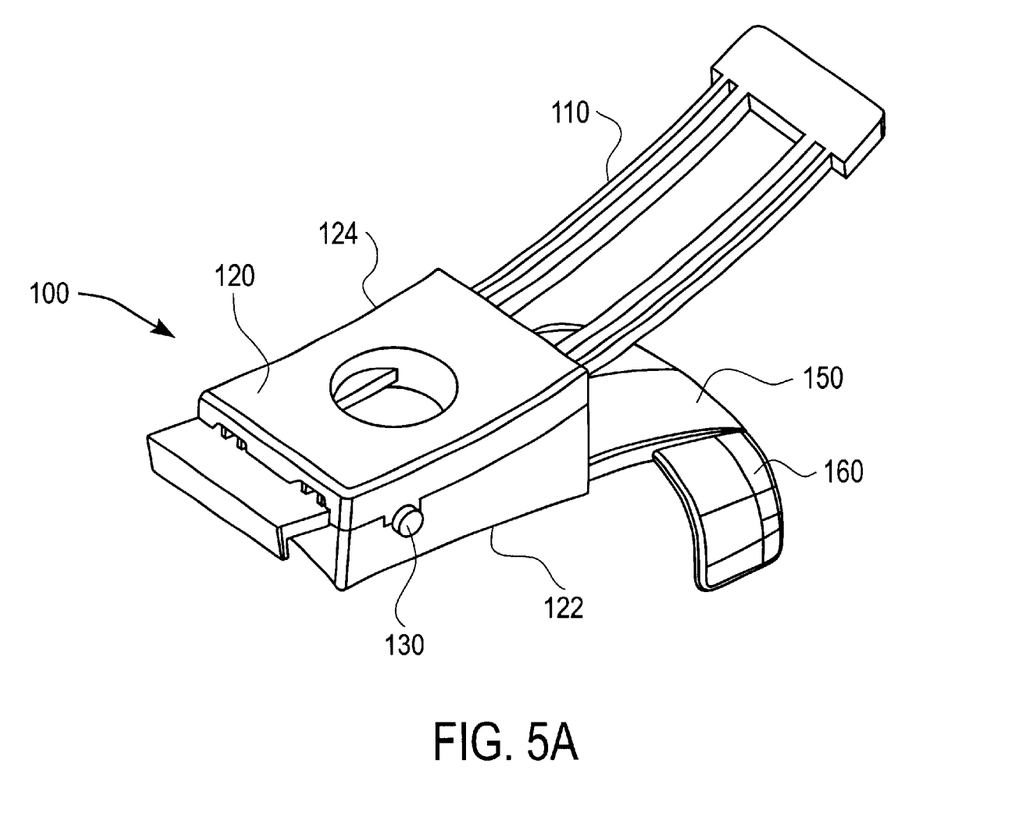
FIG. 5A is a rear perspective view of a telephone shoulder rest and stand of the invention.
Figure 5B:
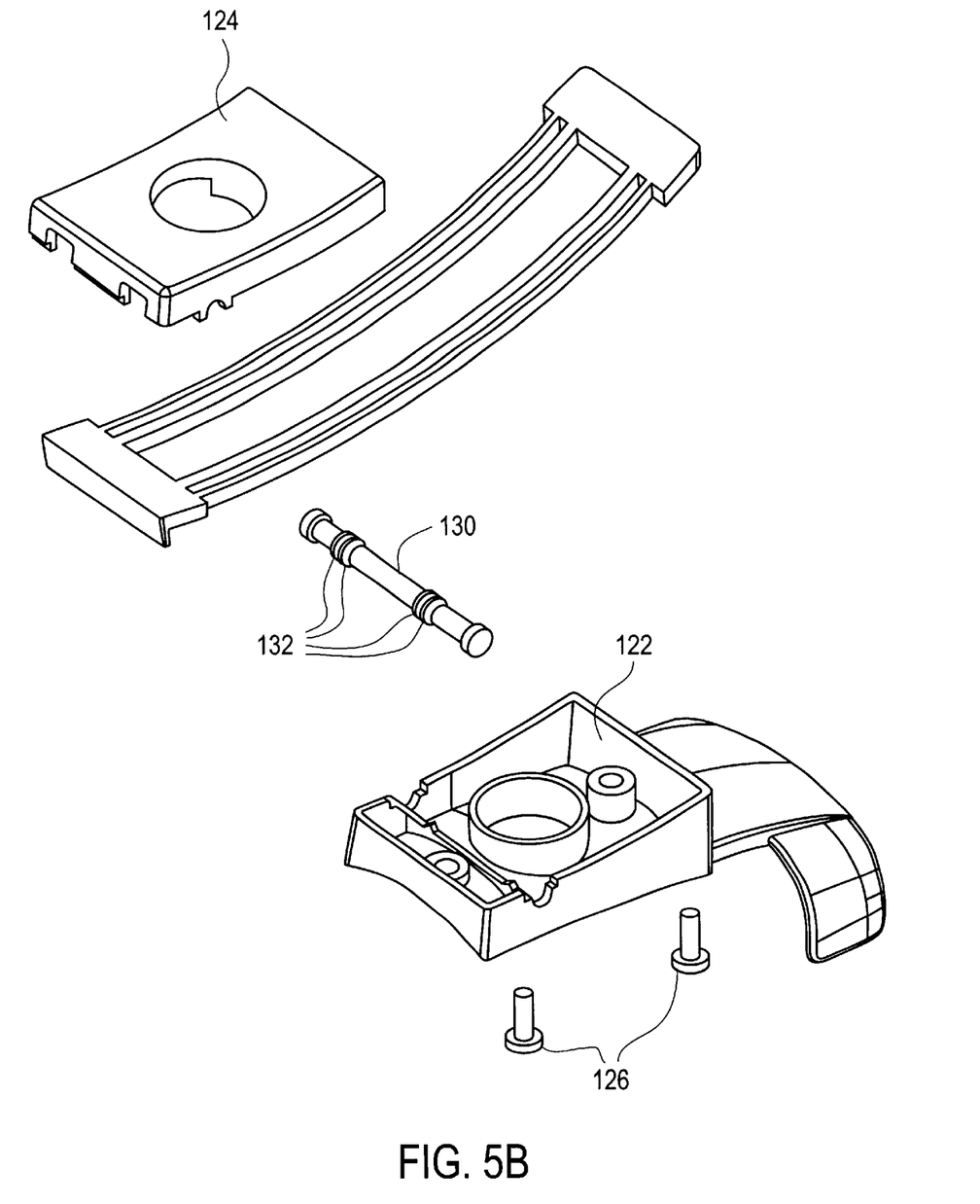
FIG. 5B is an exploded view of a telephone shoulder rest and stand of the invention, corresponding to FIG. 5A.

FIG. 4A is a front perspective view of the support 100 of the invention. FIG. 4B is an exploded view of the support 100 corresponding to FIG. 4A. FIG. 5A is a rear perspective view of the support 100 of the invention. FIG. 5B is an exploded view of the support 100 corresponding to FIG. 5A. FIGS. 4A and 4B show an attaching pin 162 on one of the attaching arms 160. There is an opposing attaching pin 162 (not shown) on the other attaching arm 160. FIGS. 4A, 4B, 5A and 5B show a base 122, a cover 124, a pair of ridges 112 on the sliding arm 110, a pair of screws 126, a pair of threaded posts 128 on the cover 124 and four ridges 132 on the locking pin 130. The body 120 comprises the base 122 and the cover 124. The base 122 and the cover 124 are held together by driving the screws 126 through the base 122, into the cover 124.

The support 100 is attached to the handset 10 by inserting the attaching pins 162 into corresponding openings (not shown) on the sides of the handset 10, with the front surface of the base 122 touching the rear surface of the handset 10. The attaching arm 160 is flexible so that the attaching pins 162 can easily be inserted into and removed from the corresponding openings in the handset 10, so that the support 100 is easily removed from the handset 10.

FIGS. 6A and 6B are rear elevational views of the support 100. The locking pin 130 is in an unlocked position in FIG. 6A and in a locked position in FIG. 6B. The locking pin 130 is simply pressed to the left to move it to the locked position and then to the right to move it back to the unlocked position. When the locking pin 130 is in the unlocked position, the sliding arm 110 is free to be slid to a desired configuration. Once the configuration is attained, the locking pin 130 can be moved into the locked position. When the locking pin 130 is in the locked position, the ridges 132 surround and press against the ridge 112 to secure the sliding arm 110 in a substantially fixed position. The ridges 132 press the sliding arm 110 against surfaces of the cover 124 to secure the sliding arm 110 in place.

The attaching extension 150, the attaching pins 162 and the body 120 constitute an attaching mechanism for attaching the support 100 to the handset 10. Various other attaching mechanisms can also be used, such as velcro, straps and adhesive, although it is preferrable that the attaching mechanism allow the support 100 to be easily attached to and removed from the handset 10. The locking pin 130, the sliding arm 110 and the body 120 constitute an adjustment mechanism for allowing the adjustment of the support 100 to a desired stand or shoulder rest configuration and a locking mechanism for substantially fixing the support 100 in the desired configuration. Other adjustment mechanisms and locking mechanisms can also be used. For example, an arm could be connected to a body by a hinge, so that the arm could be rotated between a stand configuration and a shoulder rest configuration.

What is claimed is:

1. A holder for a handset comprising:

a body;

an attaching mechanism extending from the body for attaching the holder to the handset;

an arm engaging the body and capable of sliding through the body during engagement, the arm including an open curve and providing support for the handset when the holder is in a stand configuration such that the handset is in contact with a first generally horizontal surface and only one end of the curve is in contact with a second generally horizontal surface; and a shoulder-rest surface of said arm, the surface being positioned, when the holder is in a shoulder-rest configuration, so that a user can hold the handset and the holder between his head and shoulder in a hands-free technique; and an adjustment mechanism to enable the holder to be adjusted between the stand configuration and the shoulder-rest configuration, said arm sliding through the body and along said curve for adjustment.

2. The holder of claim 1 further comprising a locking mechanism to lock the holder alternatively in the stand configuration and the shoulder-rest configuration.

3. The holder of claim 1 wherein the attaching mechanism comprises one or more attaching arms and one or more attaching pins, wherein the one or more attaching pins engage with one or more openings on the handset.

4. The holder of claim 1 wherein the arm extends beyond the end of the curve.

5. The holder of claim 2 wherein the locking mechanism comprises a locking pin that can be moved between an unlocked position whereby the sliding arm can be adjusted and a locked position whereby the sliding arm is substantially fixed in place.

6. The holder of claim 5 wherein the locking pin has one or more ridges that press against one or more ridges on the sliding arm when the locking pin is in the locked position.

7. The holder of claim 1 wherein the arm has an end piece that includes the generally horizontal surface that contacts the end of the curve.

8. The holder of claim 1 wherein the body comprises a base and a cover, wherein the base and cover are secured together.

9. The holder of claim 8 wherein the base and cover are secured together with one or more screws.

10. The holder of claim 1 wherein the holder adjusts to multiple different shoulder-rest configurations.

11. The holder of claim 10 wherein the adjustment between the multiple shoulder-rest configurations is substantially continuous.

12. The holder of claim 1 wherein the holder adjusts into a configuration that allows the handset to be inserted into a battery charger while the holder remains attached to the handset.

13. A support for a handset, the support comprising:

an attaching mechanism, the attaching mechanism attaching the support to the handset;

an arm, the arm defining an open curve and providing support for the handset when the support is used as a stand such that the handset is in contact with a first generally horizontal surface and only one end of the curve is in contact with a second generally horizontal surface; and a shoulder-rest surface of said arm, the surface being positioned so that a user can hold the handset and support between his head and shoulder in a hands-free technique with the user's head contacting the handset and the user's shoulder contacting the shoulder-rest surface, the support being convertible from the stand position to the shoulder-rest position by moving the attached handset along the curve of the arm.

14. The holder of claim 13 wherein the arm extends beyond the end of the curve.

15. The support of claim 14 additionally comprising an adjustment mechanism and a locking mechanism, the adjustment mechanism enabling the support to be adjusted between a stand configuration and a shoulder-rest configuration, the locking mechanism substantially fixing the support alternatively in either one of the stand configuration and the shoulder-rest configuration.

16. A support for a handset comprising:

a body;

an attaching mechanism extending from the body, the attaching mechanism attaching the support to the handset;

a sliding arm secured partially within the body in a slidable manner, the sliding arm including an open curve and being slidable between a stand position and a shoulder-rest position, the sliding arm providing support for the handset in the stand position when one end of the curve contacts a first generally horizontal surface and the handset contacts a second generally horizontal surface, the sliding arm having a shoulder-rest surface, the surface being positioned, when the sliding arm is in the shoulder-rest position, so that a user can hold the handset and support between his head and shoulder in a hands-free technique; and a locking mechanism, the locking mechanism having a locked configuration and an unlocked configuration, the locking mechanism substantially fixing the sliding arm in the stand position or the shoulder-rest position when in the locked configuration and allowing the sliding arm to be slid between the stand position and the shoulder-rest position when in the unlocked configuration.

17. The support of claim 16 wherein the sliding arm is continuously slidable to multiple shoulder-rest positions.

18. The support of claim 16 wherein the locking mechanism comprises a locking pin that has one or more ridges that press against one or more ridges on the sliding arm when the locking mechanism is in the locked configuration.

19. The support of claim 16 wherein the sliding arm has an end piece that includes the generally horizontal surface that the curve contacts.

20. The support of claim 16 wherein the body comprises a base and a cover.

21. The holder of claim 1 wherein the first generally horizontal surface and the second generally horizontal surface are the same surface.

22. The holder of claim 14 wherein the first generally horizontal surface and the second generally horizontal surface are the same surface.

23. The holder of claim 16 wherein the first generally horizontal surface and the second generally horizontal surface are the same surface.

* * * * *